INVENTOR:
ALLAN N. GREENWOOD
BY William Freedman
ATTORNEY

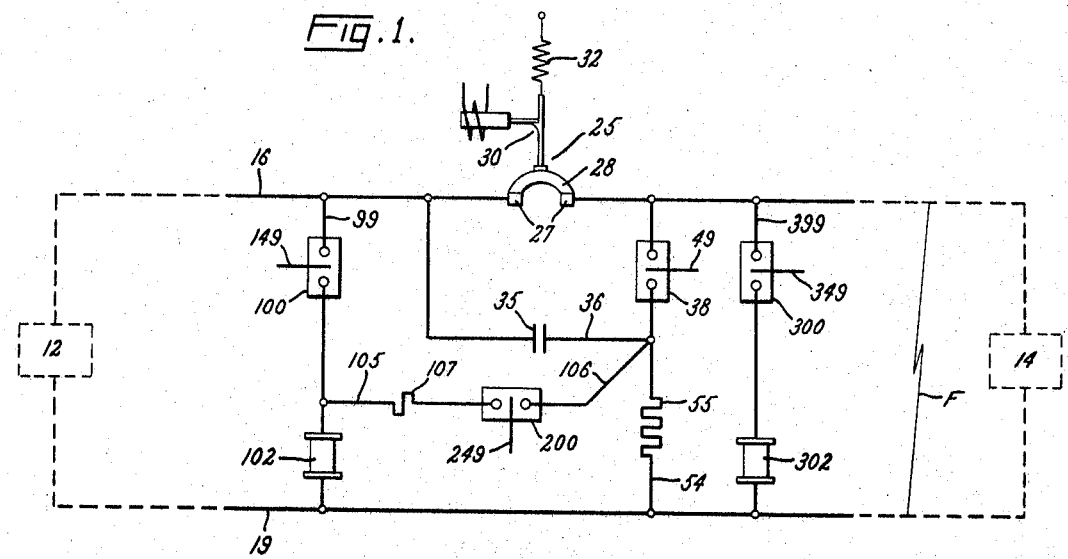
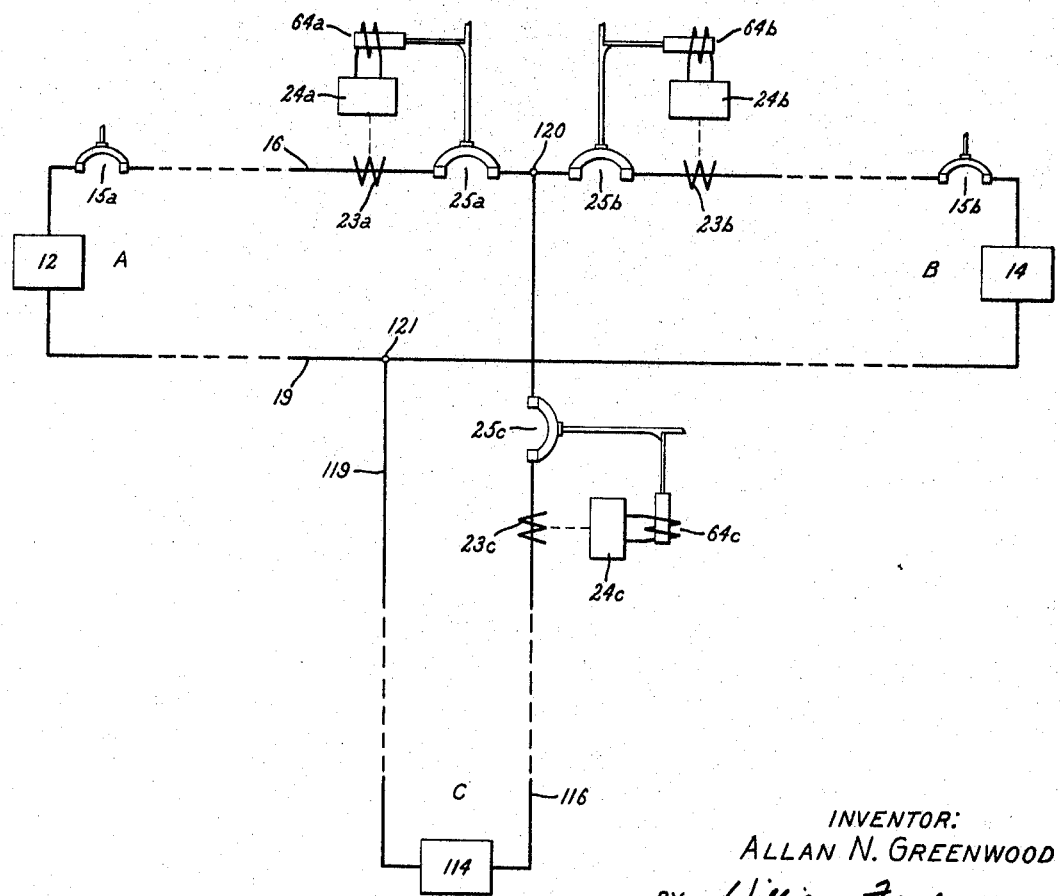

United States Patent Office 3,476,978
Patented Nov. 4, 1969

3,476,978
CIRCUIT INTERRUPTING MEANS FOR A
HIGH VOLTAGE D-C SYSTEM
Allan N. Greenwood, Media, Pa., assignor to General
Electric Company, a corporation of New York
Filed Dec. 6, 1967, Ser. No. 688,557
Int. Cl. H02h 7/22
U.S. Cl. 317—11                                    10 Claims

ABSTRACT OF THE DISCLOSURE

Circuit interrupting means for a high voltage D-C system of the type comprising a main circuit and a branch circuit tapping the main circuit intermediate its ends. Comprises three sets of separable contacts connected in the system adjacent to the tap point on opposite sides thereof. A single commutating capacitor common to all three sets is used for extinguishing the arc formed when any one set is opened. For limiting the recovery voltage appearing across the opened set of contacts, a single source-side surge suppressor is provided across the main conductors at the tap point.

BACKGROUND

This invention relates to means for interrupting a high voltage D-C circuit and relates, more particularly, to circuit interrupting means of the type in which a current zero is created by discharging a commutating capacitor through a circuit interrupting device. The invention has special application to circuit interrupting means for a high voltage D-C system that comprises a main circuit and a branch circuit tapping the main circuit intermediate its ends.

One form of high voltage D-C system comprises a main circuit with a branch circuit tapping the main circuit at a tap point intermediate the ends of the main circuit. This system may be thought of as comprising three sections, one on each side of the tap point. To provide for isolation of any one of these sections from the remainder of the system in the event of a fault in the one section, a normally closed circuit breaker can be provided between each section and the remainder of the system. When a fault develops in one section, one of the circuit breakers is opened to isolate the faulted section from the remainder of the system, thereby permitting uninterrupted service to continue over the remainder of the system. At any given tap point, there will ordinarily be three such circuit breakers, one on each side of the tap point. These circuit breakers are referred to hereinafter as tap circuit breakers.

A form of high voltage D-C circuit breaker that can be used as a tap circuit breaker is shown and claimed in my joint application Ser. No. 673,136, filed Oct. 5, 1967, and assigned to the assignee of the present invention. This circuit breaker comprises separable contacts which are normally maintained in engagement to permit load current to flow therethrough. Connected across these contacts is a normally open commutating circuit comprising normally open circuit-making means and a commutating capacitor connected in series with each other. When the contacts are separated, an arc is drawn therebetween; and this arc is subsequently extinguished by closing the circuit-making means to discharge the commutating capacitor through the arc. The capacitor discharge current is an oscillatory current that forces the total current through the contacts to zero, thus extinguishing the arc. For limiting the recovery voltage appearing across the contacts when the current is forced to zero, a surge-suppressing circuit is provided. This surge-suppressing circuit comprises the series combination of normally open gap device and a nonlinear resistor connected across the D-C circuit at the source side of the contacts. This gap device is caused to arc over immediately following the point at which current zero is reached, thus diverting energy into the surge-suppressing circuit and thereby limiting the magnitude of the recovery voltage transient appearing across the contacts.

Providing three separate circuit breakers of this form at the tap point can be a very expensive proposition. The commutating capacitor used for each such circuit breaker is quite costly, and this cost is further increased by the expense involved in providing a separate source-side surge suppressor for each circuit breaker.

SUMMARY

An object of my invention is to substitute for these three tap circuit breakers a single circuit breaker complex that requires only one commutating capacitor and only one source-side surge suppressor, thus obviating the expense of two additional commutating capacitors and two additional source-side surge suppressors.

Another object is to utilize this single commutating capacitor as a source for the commutating current used for terminating the follow current through the source-side surge suppressor immediately following an interrupting operation.

In carrying out the invention in one form, I provide three pairs of separable contacts adjacent the above described tap point of the high voltage D-C system. Two pairs of contacts are respectively connected in one of the main conductors on opposite sides of the tap point, and the remaining pair is connected in the branch conductor adjacent the tap point. Three normally open commutating circuits are respectively connected across the three pairs of contacts. These commutating circuits comprise: (1) a commutating capacitor common to all of said pairs of contacts and having one of its two terminals connected to said main conductor at said tap point, and (2) three normally open circuit-making means individual to the respective pairs of contacts, each circuit-making means connected between the other terminal of said capacitor and points on said D-C circuit on the opposite side of the associated pair of contacts from said tap point. When one pair of contacts is separated to draw an arc, the current therethrough is forced to zero by closing the associated circuit-making means to discharge the common commutating capacitor through the separated contacts via the associated commutating circuit. When this current reaches zero, the recovery voltage appearing across the contacts is limited by a surge-suppressing circuit connected across the main conductors at the tap point.

BRIEF DESCRIPTION OF DRAWINGS

For a better understanding of the invention, reference may be had to the following description taken in connection with the accompanying drawings, wherein:

FIG. 1 is a schematic diagram of the D-C circuit breaker shown in the aforesaid application Ser. No. 673,136.

FIG. 2 is a schematic diagram of a high voltage D-C system of the type I am concerned with in the present application.

DESCRIPTION OF PREFERRED EMBODIMENTS

Figure 3:
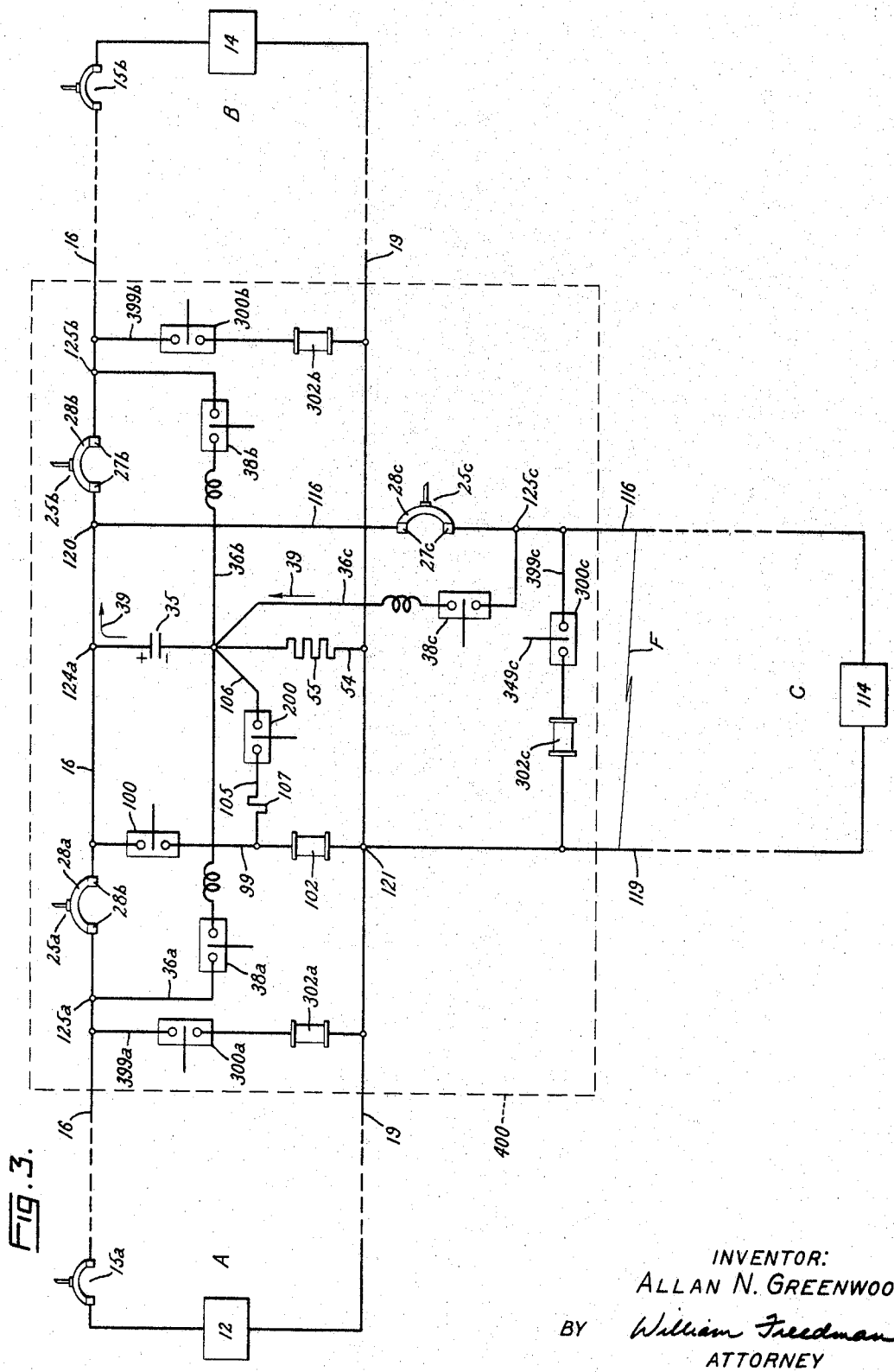
FIG. 3 is a schematic showing of a high voltage D-C system of the type depicted in FIG. 2 and including a circuit breaker complex embodying one form of my invention.

Referring now to FIG. 1, I have schematically shown therein a high voltage D-C circuit breaker of the form disclosed and claimed in the aforesaid application Ser. No. 673,136, Greenwood et al. The parts of this circuit breaker are designated with the same reference numerals as used in the Greenwood et al. application to designate corresponding parts, and reference may be had to the Greenwood et al. application for a more detailed disclosure of these parts. The circuit breaker of FIG. 1 comprises a pair of separable contacts 27, 28 which are connected in a first conductor 16 between a source 12 and a load 14. These contacts 27, 28 are normally maintained in engagement to enable load current to flow therethrough. A normally-open commutating circuit 36 is connected across the contacts 27, 28 and comprises normally open circuit-making means 38 and a commutating capacitor 35 connected in series-circuit relation with each other. The commutating capacitor is connected to the D-C circuit at the source side of the contacts 27, 28 even when the circuit-making means is open.

For causing the capacitor 35 to be charged from the source when the circuit-making means 38 is open, resistance means 55 is connected between the juncture of the capacitor 35 and the circuit-making means 38 on one hand and the return conductor 19 to the source on the other hand. If a fault should occur at F, a hold-closed latch 30 is tripped by suitable overcurrent-sensitive control means (not shown), and the contacts 27, 28 are separated by an opening spring 32. This contact-separation draws an arc between the contacts. Current through the separated contacts is forced to zero by suitable control means which closes the circuit-making means 38 upon establishment of the arc, thus discharging capacitor 35 through the arc.

For limiting the recovery voltage appearing across the separated contacts 37, 38 when the current through the contacts is forced to zero, a surge-suppressing circuit 99 is provided. This surge-suppressing circuit comprises the series combination of a normally open gap device 100 and nonlinear resistor 102 connected between the source side of the contacts and the return conductor 19. The normally open gap device is a trigggered vacuum gap having a trigger lead 149. The normally open gap device 100 is caused to spark over immediately following current zero and before the recovery voltage transient can reach an objectionably high value by suitable control means (not shown), which is connected to the trigger lead 149. When trigger gap device 100 is thus sparked over, current from the source passes through the gap device 100 and resistor 102. This current is forced to zero after an appropriate interval by connecting the commutating capacitor 35 across gap device 100 and causing it to discharge through gap device 100. This is done with a triggered vacuum gap device 200 connected between the juncture of the commutating capacitor 35 and the circuit-making means 38 and the juncture of gap device 100 and resistor 102.

On the load side of the contacts, there is a second surge-suppressing circuit 399 connected between conductors 16 and 19. This second surge-suppressing circuit comprises the series combination of another triggered gap device 300 and a nonlinear resistor 302. Suitable control means connected to the trigger lead 349 of gap device 300 is provided for causing sparkover of this gap device during an interrupting operation immediately after the current through contacts 27, 28 has been forced to zero.

The circuit breaker described up to this point can be used as a tap circuit breaker in the high voltage D-C system schematically depicted in FIG. 2. This system comprises a main circuit 16, 19 and a branch circuit 116, 119 tapping the main circuit at tap points 120, 121 intermediate the ends of the main circuit. This system may be though of as comprising three sections: A, B, and C, one on each side of tap points 120, 121. To provide for isolation of any one of these sections from the remainder of the system in case of a fault in one section, a normally-closed tap circuit breaker is provided between each section and the remainder of the system. These tap circuit breakers are designated 25a, 25b, and 25c, respectively. When a fault develops in one section, the tap circuit breaker connecting that section of the system to the remainder of the system is opened to isolate the fault from the remainder of the system, thereby permitting uninterrupted service to continue over the remainder. For example, if a fault should develop on system section C, tap circuit breaker 25c is opened to isolate section C from the remainder of the system, permitting a source at 12 to continue supplying a load at 14. Or if a source is at 14 and the load at 12, the source 14 can continue to supply current to the load at 12.

If the source is assumed to be at 12 and the fault is assumed to develop on system portion B instead of C, then the circuit interrupter 25b would be opened, and the source at 12 could continue to supply the load at 114. If the source is at 14 when the fault develops on system portion B, it will be necessary to open a terminal circuit breaker 15b to isolate system portion B from the current source. This terminal circuit breaker can be of the form shown in U.S. Patent 3,252,050, Lee, assigned to the assignee of the present invention. A similar terminal circuit breaker 15a is shown adjacent the location 12. In the present application, I am not concerned with the construction of the terminal circuit breakers.

For controlling the tap circuit breakers 25a, 25b, and 25c in the above described manner, a conventional relaying system is provided. In the illustrated embodiment, this relaying system comprises overcurrent-sensitive relays 24a, 24b, and 24c of a suitable conventional form respectively controlling the three tap circuit breakers 25a, 25b, and 25c. Suitable D-C current transformers 23a, 23b, and 23c supply information on the magnitude of the line current to the overcurrent sensitive relays 24a, 24b, and 24c, respectively. An example of a suitable D-C current transformer for this purpose is illustrated in a paper by Adamson and Hingorani, Proceedings I.E.E., volume 110, No. 4, April 1963, pages 739–750. The time-current characteristics of the relays are so selected that in the event of an overcurrent, the relay nearest the fault will operate more quickly than the relay more remote from the fault. This permits the relay nearest the fault to cause its associated circuit breaker to trip and interrupt the fault current before the remote overcurrent relay can cause its circuit breaker to operate. When the fault current is thus interrupted by the closer circuit breaker, the more remote overcurrent relay resets and its associated circuit breaker accordingly remains closed. If the source is at 14 instead of 12, then the overcurrent relays at 24a and 24b are suitably adjusted so that 24b operates more quickly than 24a. When any one of the relays 24a, 24b, or 24c operates, a suitable tripping signal is supplied to an associated tripping solenoid 64a, 64b, or 64c which operates to release its associated circuit breaker for opening under the influence of a suitable opening spring (not shown in FIG. 2).

Three separate circuit breakers, each constructed as illustrated in FIG. 1, can be used as the tap circuit breakers 25a, 25b, and 25c, respectively, of FIG. 2. But this approach is an expensive one since it requires three separate commutating capacitors and three separate source-side surge suppressors; and these components can be quite costly.

In accordance with my invention, I have provided a single circuit breaker complex which can perform the function of the three separate tap circuit breakers but requires only one commutating capacitor and one source-side surge suppressor. This circuit breaker complex is illustrated at 400 in FIG. 3. Since the individual components of this circuit breaker complex are conventional and are disclosed in detail in the aforesaid application Ser. No. 673,136, they have been shown in schematic form only. This circuit breaker complex is connected in a high voltage D-C system that comprises first and second main conductors 16 and 19 extending between terminal equipments 12 and 14. It will be assumed that each of the terminal equipments is a converter that can operate either as a rectifier or as an inverter, depending upon system requirements. When operating as a rectifier, the equipment 12 or 14 can be considered as a source; and when operating as an inverter it can be considered a load. Connected to the first and second conductors 16 and 19 at first and second tap points 120 and 121, respectively, are first and second branch conductors 116 and 119. These branch conductors can be used to supply current from the main conductors to a load 114 connected across the branch conductors at a location remote from the tap points 120, 121.

The circuit breaker complex 400 comprises three pairs of separable contacts 27a, 28a; 27b, 28b; and 27c, 28c, constituting portions of interrupters 25a, 25b, and 25c, respectively. Two of these pairs of contacts are connected in one of the main conductors 16 adjacent to and on opposite sides of tap point 120; and the other pair is connected in branch conductor 116 adjacent tap point 120. For initiating operation of an appropriate pair of these contacts in response to a fault on the system, a relaying system of the type schematically shown in FIG. 2 and described hereinabove is utilized.

Connected across the three pairs of contacts are normally open commutating circuits 36a, 36b, and 36c, respectively. These commutating circuits comprise a single commutating capacitor 35 common to all of the contact pairs and three circuit-making means 38a, 38b, and 38c individual to the respective contact pairs. The commutating capacitor 35 has its upper terminal connected to main conductor 16 at a point between the three contact pairs. The circuit-making means 38a, 38b, and 38c are respectively connected between the lower terminal of capacitor 35 and points 125a, 125b, and 125c on the D-C circuit on the opposite side of the associated contact pair from the top point 120. Each of the circuit-making means 38a, 38b, and 38c is preferably a triggered vacuum gap corresponding to the triggered vacuum gap 38 of FIG. 1.

Commutating capacitor 35 is charged through main conductors 16, 19 whenever the circuit making means 38a, 38b, and 38c are open. This is made possible by a charging circuit 54 comprising a resistor 55 connected between the lower terminal of capacitor 35 and lower main conductor 19.

If a fault should occur on system portion C, the contacts 28c, 27c are separated to produce an arc between them. Immediately thereafter circuit-making means 38c is triggered into conduction, and this discharges the commutating capacitor 35 through a loop circuit that comprises the series combination of the contacts 27c, 28c and the commutating circuit 36c. This loop circuit is an oscillatory circuit, and the discharge current is a relatively high frequency oscillatory current that is superimposed on the fault current flowing through line 116. When this oscillatory current approaches its negative peak, the total current is driven to zero and the arc is extinguished. During initial discharge of capacitor 35, current in the commutating circuit flows in the direction of arrow 39; but it reverses during oscillation toward a negative peak and is thus able to drive the fault current to zero.

Interruption is successfully completed at this current zero if the gap then present between contacts 27c, 28c can successfully withstand the recovery voltage transient that is quickly built up across the gap when the current zero point is reached. For limiting the magnitude of this recovery voltage transient, surge-suppressing circuit 99 is provided. This surge-suppressing circuit comprises the series combination of normally open triggered vacuum gap device 100 and nonlinear resistor 102. The upper terminal of this surge-suppressing circuit is connected to the portion of the D-C circuit between the three pairs of separable contacts, and the lower terminal is connected to return conductor 19. Gap device 100 is caused to arc over immediately after the current zero point is reached by means of a suitable control signal applied to its trigger lead 149. This arcover occurs well before the voltage across the contacts rises to a value which might reignite the arc. Arcover of the gap device 100 diverts current through the suppressor circuit 99 via nonlinear resistor 102, thereby dissipating the energy of the transient in the nonlinear resistor.

The gap device 100, being a vacuum device, cannot interrupt the current through suppressor circuit 99 until it is forced to zero. For forcing this current to zero, I supply to gap device 100 an oscillatory commutating current that is derived from the same capacitor 35 as was used for commutating the current through the contacts 27c, 28c. This capacitor 35 is in a charged condition at this instant since it was charged by the recovery voltage transient.

For initiating this commutating current, another triggered vacuum gap device 200 is provided. This gap device 200 is normally nonconductive but is rendered conductive by supplying to its trigger lead 249 a suitably timed triggering pulse. When gap device is thus rendered conductive, a discharge circuit for the commutating capacitor 35 is completed therethrough via conductors 105 and 106 and resistor 107. This discharge current is also an oscillatory current which forces the total current through the gap device 100 to zero. A recovery voltage builds up across gap device 100 following this current zero point, but the peak voltage developed by this recovery voltage is relatively low and can be easily withstood by gap device 100. The reason for this peak voltage being relatively low is that current interrupted by the gap device 100 is low in view of the current-limiting action imposed by nonlinear resistor 102 during the period immediately preceding commutation of gap device 100.

It is to be noted that only a single commutating capacitor is used for commutating the current through the main interrupter 25c and through surge-suppressor circuit 99. Using the same capacitor for both these functions is a significant economic advantage.

Assume again that the source is located at 12 but that a fault occurs on system portion C instead of system portion B, as above described. Then the contacts 27b, 28b, instead of 27c, 28c, would be separated to initiate fault isolation. The arc drawn between these contacts 27b, 28b by such separation would be extinguished by discharging commutating capacitor 35 through the separated contacts via commutating circuit 36b. The recovery voltage that builds up immediately following current zero would be limited by surge-suppressor circuit 99 in the same way as described with respect to the interrupter operation at 27c, 28c. That is, trigger vacuum gap 100 would be arced over to permit current to flow through surge-suppressor circuit 99, and this current would thereafter be terminated by turning on gap device 200 to discharge commutating capacitor 35 through gap device 100 via circuit 106, 200, 107, 105, 99, 100, 16. Assume next that the source is located at 14, instead of 12, and a fault occurs on system portion A. Then the contacts 27a, 27b would be separated to initiate fault isolation. The arc drawn between these contacts would be extinguished by discharging capacitor 35 through the separated contacts via commutating circuit 36a. The recovery voltage that builds up immediately following current zero would be limited by surge-suppressor circuit 99 in the same manner as described with respect to the other interrupting operations. For this interrupting operation, the surge-suppressor circuit 99 is located on the source side of the contacts 27a, 28, and can therefore act once again as a source-side surge suppressor.

It will be apparent from the above that regardless of where the fault is located, only one of three sets of contacts needs to be opened to effect the desired isolation of the fault from the sound portion of the system and from the source that is then supplying current to the system. In addition, regardless of where the fault is located, the single surge-suppressor circuit 99 is in a position at the source side of the operated contacts and is thus able to limit in the desired manner the severity of the recovery voltage transient appearing across these contacts.

For dissipating the energy stored in the power circuit on the load side of any operated interrupter immediately following interruption, three load side surge-suppressor circuits 399a, 399b, and 399c are provided. Each of these load side surge-suppressor circuits is identical, and therefore only one of these, the circuit 399c, will be described. This load side surge-suppressing circuit 399c comprises the series combination of a triggered vacuum gap 300c and a nonlinear resistor 302c. This surge suppressing circuit 399c is connected between line 116 and return conductor 119 at the load terminal of interrupter 25c. Assume now that the interrupter 25c has been opened to initiate isolation of a fault on the system portion C in the manner described hereinabove. Shortly after current zero through the main interrupter and when the voltage across gap device 300c reaches a predetermined value, gap device 300c is triggered into conduction by a suitably controlled triggering signal applied to its trigger lead 349c, thereby completing suppressor circuit 399c. This permits the energy stored in the load side inductance to be dissipated through a closed loop that comprises the fault path F, a portion of return conductor 119, suppressor circuit 399c and a portion of conductor 116. Gap device 300c requires no interrupting ability since there is no current source on the load side that would continue feeding current through the suppressor circuit. The current on the load side simply decays to zero in a time proportional to the time constant of this loop circuit. When the current through the suppressor circuit reaches zero, gap device 300c recovers its dielectric strength and returns to its original nonconducting condition.

The voltage appearing across the separated contacts of the interrupter 25c immediately following current zero is equal to the difference between (1) the voltage (between conductors 116 and 119) on the source side of the interrupter, and (2) the voltage (between conductors 116 and 119) on the load side, these two voltages being of opposite polarities. This voltage is limited to a relatively low value by producing sparkover of gap devices 100 and 300 when the voltages thereacross are relatviely low and by limiting the voltages developed across the nonlinear resistors 102 and 302c to low values by appropriate selection of the resistors. In one embodiment of the invention, the non-linear resistors are so selected that the maximum voltage developed across resistor 102 is 1.6 per unit and the maximum voltage developed across resistor 302c is —0.8 per unit. The maximum voltage across contacts, being the difference between these voltages, is 2.4 per unit.

It should be understood that, of the three load-side surge-suppressors, only the one on the load side of the particular interrupter that operates is caused to sparkover during the interrupting operation. The other load-side surge suppressors remain inactive during this interrupting operation.

In certain high voltage D–C systems the source will always be at one end of the main circuit and the load at the other. In such a system only two interrupters are required. For example, if the source is always located at 12 and the load at 14, then only the tap interrupters 25b and 25c are needed. The tap interrupter 25a and its associated surge suppressor and commutating circuit can be omitted in such a system.

Although I have depicted each of the interrupters 25a, 25b, and 25c as comprising only a single pair of separable contacts, it is to be understood that each interrupter could comprise a plurality of series-connected pairs of separable contacts, simultaneously operable in a suitable conventional manner. Plural pairs of contacts are needed when the circuit voltage is higher than that which can be handled by a single pair. Similarly, all the other switching devices, which are shown as simple units, can comprise a plurality of series-connected, simultaneously operable units in order to accommodate higher voltages.

While I have shown and described a particular embodiment of my invention, it will be obvious to those skilled in the art that various changes and modifications may be made without departing from my invention in its broader aspects; and I, therefore, intend herein to cover all such changes and modifications as fall within the true spirit and scope of my invention.

What I claim as new and desire to secure by Letters Patent of the United States is:

1. In a D-C circuit comprising: first and second main conductors through which current can be fed from a source at either end of the conductors to a load connected across said conductors at their opposite end, and first and second branch conductors respectively connected to said first and second main conductors at first and second tap points for supplying current from said main conductors to another load connected across said branch conductors at a location remote from said tap points; circuit-interrupting means comprising:
  (a) three pairs of separable contacts, two connected in the first of said main conductors adjacent to and on opposite sides of said first tap point and one connected in the first of said branch conductors adjacent said first tap point,
  (b) three normally open commutating circuits respectively connected across said pairs of contacts, comprising:
    (b′) a commutating capacitor common to all of said pairs of contacts and having opposed terminals, one of which is connected to said first main conductor at a point between said pairs of contacts in said first main conductor,
    (b″) three normally open circuit making means individual to the respective pairs of contacts, said circuit-making means being connected between the other terminal of said capacitor and points on said D-C circuit on the opposite side of the associated pair of contacts from said tap point,
  (c) means for causing said commutating capacitor to be charged when said circuit-making means are open,
  (d) means for separating one of said pairs of contacts to draw an arc therebetween,
  (e) means for forcing the current through said separated contacts to zero comprising means for closing the associated circuit-making means upon establishment of said arc to discharge said commutating capacitor through said arc,
  (f) and means for limiting the recovery voltage appearing across said separated contacts when the current therethrough is forced to zero comprising:
    (f′) a single surge-suppressing circuit comprising the series combination of a normally open gap device and a resistor connected between the portion of the first main conductor between said pairs of contacts and said second main conductor,
    (f″) and means for causing a sparkover of said gap device near the point at which current through the separated contacts reaches zero.

2. The circuit interrupting means of claim 1 in combination with means for forcing the current through said gap device to zero comprising means for connecting said commutating capacitor across said gap device to discharge said commutating capacitor therethrough.

3. The circuit interrupting means of claim 1 in which the means for causing said commutating capacitor to be charged causes charging current to be supplied through said main conductors and comprises resistance means connected between the juncture of said commutating capacitor and said three circuit-making means on one hand and the second of said main conductors on the other hand.

4. The circuit interrupting means of claim 3 in combination with means for forcing the current through said gap device to zero comprising means for connecting said commutating capacitor across said gap device to discharge said commutating capacitor therethrough.

5. The circuit interrupting means of claim 1 in combination with three additional surge-suppressing circuits respectively associated with the three pairs of contacts, two of said additional surge-suppressing circuits being connected across said main conductors and one being connected across said branch conductors at points on the opposite side of their associated pair of contacts from the location of said first tap point.

6. The circuit interrupting means of claim 5 in which each of said additional surge-suppressing circuits comprises the series combination of a gap device and a nonlinear resistor, and means for causing a sparkover of the gap device associated with the operated pair of contacts immediately after the current through said operated pair of contacts has been forced to zero.

7. The circuit interrupting means of claim 1 in combination with relay means responsive to a fault on said system on the load side of said circuit interrupting means for producing a separating operation of the pair of contacts nearest said fault, said other parts of contacts normally remaining closed during said separating operation to permit continued service to be maintained through said other pairs.

8. In a D-C circuit comprising: first and second main conductors through which current can be fed from a source at one end of said conductors to a load connected across said conductors at their opposite end, and first and second branch conductors respectively connected to said first and second main conductors at first and second tap points for supplying current from said main conductors to another load connected across said branch conductors at a location remote from said tap points; circuit interrupting means comprising:
  (a) two pairs of separable contacts adjacent said first tap points, one connected in said main conductor on the load side of the first tap point and the other connected in the first of said branch conductors on the load side of said first tap point,
  (b) means for normally maintaining said parts of contacts in engagement to enable load current to flow therethrough,
  (c) two normally open commutating circuits respectively connected across said pairs of contacts, comprising:
    (c′) a commutating capacitor common to both of said pairs of contacts and having opposed terminals, one of which is connected to said first main conductor at a point on the source side of said two pairs of contacts,
    (c″) two normally open circuit-making means individual to the respective pairs of contacts, each circuit-making means connected between the other terminal of said capacitor and a point on said D-C circuit on the load side of its associated pair of contacts,
  (d) means for causing said commutating capacitor to be charged when said circuit making means are open,
  (e) means for separating one of said pairs of contacts to draw an arc therebetween,
  (f) means for forcing the current through said separated contacts to zero comprising means for closing the associated circuit-making means upon establishment of said arc to discharge said commutating capacitor through said arc,
  (g) and means for limiting the recovery voltage appearing across said separated contacts when the current therethrough is forced to zero comprising:
    (g′) a surge-suppressing circuit comprising the series combination of a normally open gap device and a resistor connected between the source terminal of said first pair of contacts and said second main conductor,
    (g″) and means for causing a sparkover of said gap device near the point at which current through the separated contacts reaches zero.

9. The circuit interrupting means of claim 8 in combination with means for forcing the current through said gap device to zero comprising means for connecting said commutating capacitor across said gap device to discharge said commutating capacitor therethrough.

10. The circuit interrupting means of claim 8 in combination with relay means responsive to a fault on said system on the load side of said circuit interrupting means for producing a separating operation of the pair of contacts nearest said fault, said other pair of contacts normally remaining closed during said separating operation to permit continued service to be maintained through said other pair.

References Cited
UNITED STATES PATENTS

| | | | |
|---|---|---|---|
| 2,789,253 | 4/1957 | Vang | 317—11 |
| 2,834,932 | 5/1958 | Dewey | 317—11 X |
| 3,309,570 | 3/1967 | Goldberg | 317—11 |

JOHN F. COUCH, Primary Examiner

J. D. Trammell, Assistant Examiner

U.S. Cl. X.R.

317—29, 50; 307—136